United States Patent
Parolini et al.

(10) Patent No.: US 8,968,497 B2
(45) Date of Patent: Mar. 3, 2015

(54) METHODS OF FORMING AND AUSTEMPERING A DUCTILE IRON ARTICLE AND ARTICLE MADE THEREBY

(75) Inventors: Jason Robert Parolini, Greer, SC (US); Junyoung Park, Greer, SC (US)

(73) Assignee: General Electric Company, Schenectady, NY (US)

(*) Notice: Subject to any disclaimer, the term of this patent is extended or adjusted under 35 U.S.C. 154(b) by 192 days.

(21) Appl. No.: 13/294,365

(22) Filed: Nov. 11, 2011

(65) Prior Publication Data

US 2013/0118656 A1    May 16, 2013

(51) Int. Cl.
| | |
|---|---|
| C21D 8/00 | (2006.01) |
| C21D 5/00 | (2006.01) |
| C21D 1/20 | (2006.01) |
| F03D 11/02 | (2006.01) |

(52) U.S. Cl.
CPC .. C21D 5/00 (2013.01); C21D 1/20 (2013.01); F03D 11/02 (2013.01); *C21D 2211/001* (2013.01); *C21D 2211/006* (2013.01); *F05B 2240/60* (2013.01); *F05C 2201/0445* (2013.01); *F05B 2230/40* (2013.01); *Y02E 10/722* (2013.01)
USPC .......................................... 148/653; 148/320

(58) Field of Classification Search
CPC ... C21D 1/20; C21D 2211/001; C21D 11/006
USPC ................................................. 148/653, 320
See application file for complete search history.

(56) References Cited

U.S. PATENT DOCUMENTS

| | | | |
|---|---|---|---|
| 4,533,390 A | 8/1985 | Sherby et al. | |
| 5,028,281 A * | 7/1991 | Hayes et al. | 148/321 |
| 5,445,685 A | 8/1995 | Strum et al. | |
| 5,522,949 A | 6/1996 | Widmer et al. | |

(Continued)

FOREIGN PATENT DOCUMENTS

EP        2072863 A1    6/2009

OTHER PUBLICATIONS

NPL: J. Achary et al: Microstructure development and austempering kinetics of ductile iron during thermomechanical processing, Metallurgical and materials transactions A, vol. 31A Oct. 2000, pp. 2575-2585.*

(Continued)

*Primary Examiner* — Jie Yang
(74) *Attorney, Agent, or Firm* — Cantor Colburn LLP

(57) ABSTRACT

A method of making a ductile iron article is disclosed. The method includes providing a ductile iron article preform. The method also includes deforming the ductile iron article preform by hot-working to provide a hot-worked portion of the article. The method further includes cooling the article to an austempering temperature. Still further, the method includes austempering the ductile iron article preform for a predetermined time sufficient to provide an austempered article preform comprising an austempered microstructure, wherein the austempered microstructure of the hot-worked portion is different than in other portions of the article. A ductile iron wind turbine shaft is also disclosed. The ductile iron wind turbine shaft has an austempered microstructure comprising an ausferrite matrix and a plurality of graphite nodules. The austempered microstructure has a deformed portion, the deformed portion has a microstructure that is different than the microstructure of the other portion of the shaft.

13 Claims, 4 Drawing Sheets

(56) References Cited

U.S. PATENT DOCUMENTS

2010/0084059 A1     4/2010    Pfaffman et al.
2011/0017364 A1     1/2011    Park et al.

OTHER PUBLICATIONS

Nofal, A. "An Overview on Cast Iron Research at CMRDI", Key Engineering Materials, vol. 457, (2011), pp. 3-10.

Delbrugge, Vince. "Ausform Finishing for Bulk Strength and Ductility", iMAST Quarterly 1999, No. 1, pp. 3-6.

Ibrahim, K.M. "Microstructure and Mechanical Behaviour of Ni-Alloyed Ausformed Austempered Ductile Iron", Canadian Metallurgical Quarterly, vol. 44, No. 4, pp. 505-513, 2005.

Syn, C.K., Lesuer, D.R., Sherby, O.D.. "Thermo-Mechanical Processing and Properties of a Ductile Iron", Lawrence Livermore National Laboratory, TMS Symposium, Indianapolis, IN, 1997, UCRL-JC-128056.

DeLa'O, J.D.; Burke, C.M., Lagather, B., Moore, D.J. and Rundman, K.B.. "Thermomechanical Processing of Austempered Ductile Iron", The Minerals, Metals & Materials Society, 1997, pp. 79-100.

Hayrynen et al., "Microstructural Study of Ausformed-Austempered Ductile Iron", AFS Transactions 1996, 95-51, pp. 157-163.

C.-K Lin et al., "Influence of Microstructure on the Fatigue Properties of Austempered Ductile Irons-II. Low-cycle Fatigue", Int. J. Fatigue, vol. 18, No. 5, pp. 309-320, 1996.

H. Werner, et al., "Wind energy requires foundry sector", New dimension from the casting to logistics, Construction, pp. 1-2, Jan./Feb. 2006.

C. Ji, et al., "Study of a new type ductile iron for rolling: Composition design (1)", Materials Science and Engineering A: Structural Materials: Properties, Microstructure & Processing, vol. 419, pp. 318-325, Mar. 15, 2006.

J. Achary et al., "Microstructural Development and Austempering Kinetics of Ductile Iron during Thermomechanical Processing", Metallurgical and Materials Transactions A: Physical Metallurgy and Materials Science, vol. 31A, pp. 2575-2585, Oct. 2000.

European Search Report (partial), in corresponding EP Application No. 12192058.1, dated Dec. 11, 2013.

\* cited by examiner

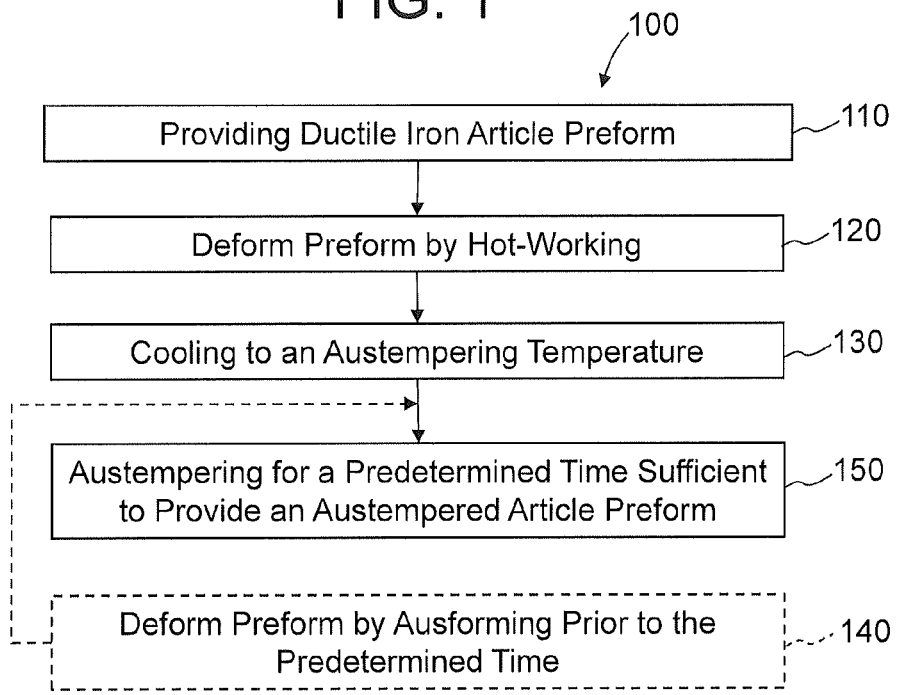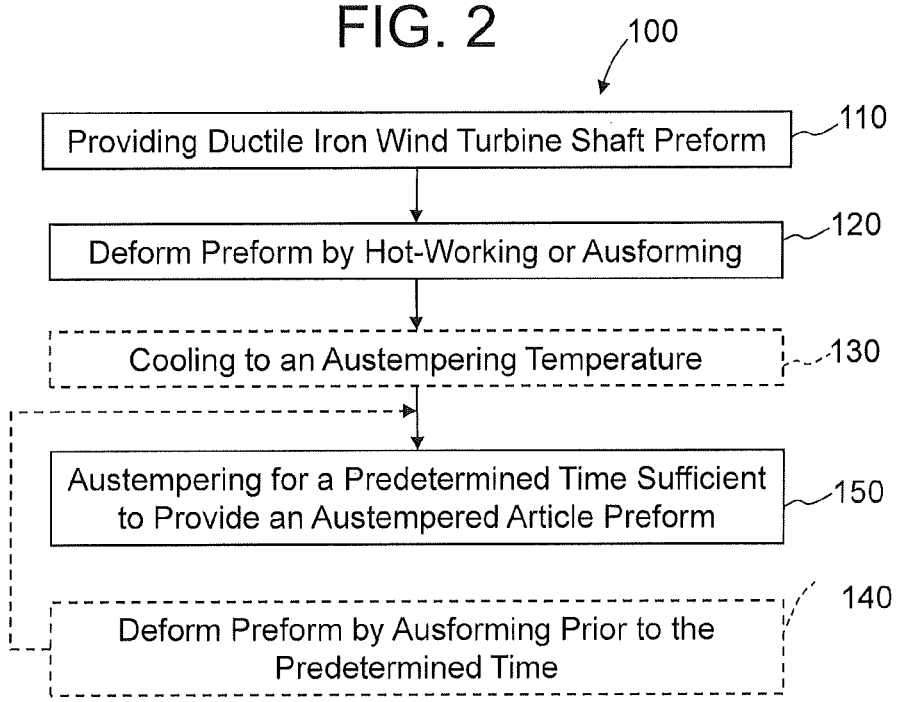

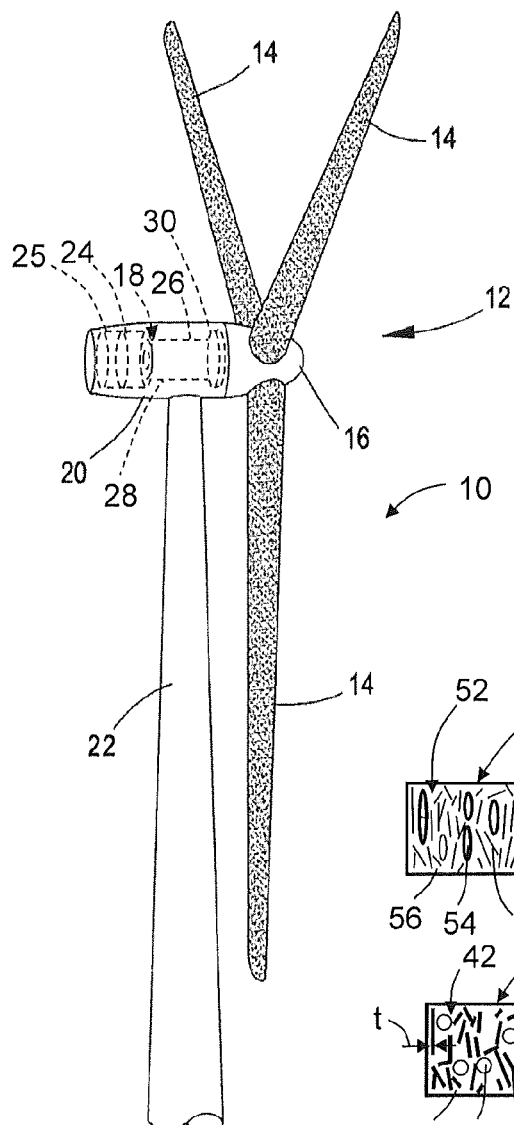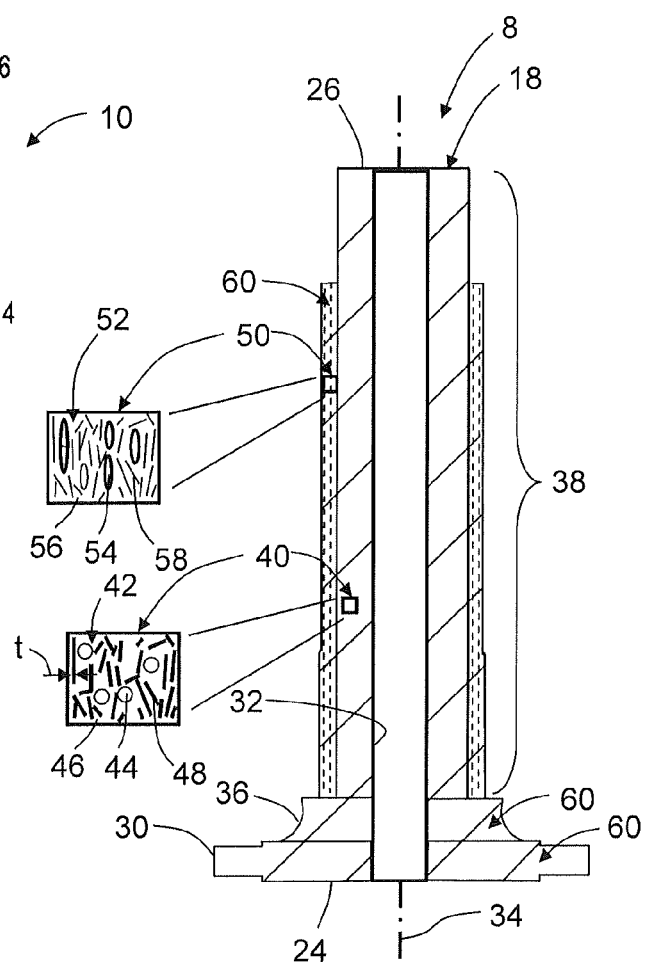

US 8,968,497 B2

METHODS OF FORMING AND AUSTEMPERING A DUCTILE IRON ARTICLE AND ARTICLE MADE THEREBY

BACKGROUND OF THE INVENTION

A method of making large articles from ductile iron alloys is disclosed, and, more particularly, a method of making a main shaft of a wind turbine from ductile iron alloys by forming the alloys followed by austempering.

Various alloys have been considered and used to produce large shafts, such as the main shaft of a wind turbine. As an example, forged steel alloys are commonly used for main shafts in wind turbine applications. While forged steel wind turbine shafts are useful, they are generally costly due to their size and the mechanical processing (e.g., forging), heat treating and machining required to obtain the necessary alloy properties.

Due to their strength, toughness, and machinability, ductile iron (cast nodular iron) alloys have also been used to produce wind turbine main shafts. Typical production methods for these shafts have included conventional sand casting. These methods have generally been employed to produce relatively smaller shafts having wall section thicknesses of less than fifteen centimeters. While these methods are useful to produce ductile iron wind turbine shafts, they are generally not well-suited to the demanding service requirements of more recent wind turbine designs, which include larger sizes, including higher casting weights, larger diameters and larger shaft wall section thicknesses. As larger main shafts become required for wind turbine applications, their design requirements for strength and toughness have exceeded the capability of conventional cast and austempered ductile iron alloys, and methods that enable the manufacture ductile iron main wind turbine shafts having larger sizes, including higher casting weights, larger diameters and larger shaft wall section thicknesses is very desirable.

BRIEF DESCRIPTION OF THE INVENTION

According to one aspect, an exemplary embodiment of a method of making a ductile iron article is disclosed. The method includes providing a ductile iron article preform. The method also includes deforming the ductile iron article preform by hot-working to provide a hot-worked portion of the article. The method further includes cooling the article to an austempering temperature. Still further, the method includes austempering the ductile iron article preform for a predetermined time sufficient to provide an austempered article preform comprising an austempered microstructure, wherein the austempered microstructure of the hot-worked portion is different than in other portions of the article.

According to another aspect, a method of making a ductile iron wind turbine shaft is disclosed. The method includes providing a ductile iron wind turbine shaft preform. The method also includes deforming the ductile iron wind turbine shaft preform by hot-working to provide a hot-worked portion of the wind turbine shaft preform or ausforming to provide an ausformed portion of the wind turbine shaft preform, or a combination thereof. The method further includes cooling the wind turbine shaft preform to an austempering temperature. Still further, the method includes austempering the ductile iron wind turbine shaft preform for a predetermined time sufficient to provide an austempered wind turbine shaft preform comprising an austempered microstructure, wherein the austempered microstructure of the hot-worked portion or the ausformed portion is different than in other portion of the wind turbine shaft preform.

According to yet another aspect, a ductile iron wind turbine shaft is disclosed. The ductile iron wind turbine shaft has an austempered microstructure comprising an ausferrite matrix and a plurality of graphite nodules. The austempered microstructure has a deformed portion, the deformed portion has a microstructure that is different than the microstructure of the other portion of the shaft.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a flow chart of an exemplary embodiment of a method of making a ductile iron article as disclosed herein;

FIG. 2 is a flow chart of an exemplary embodiment of a method of making a ductile iron wind turbine shaft as disclosed herein;

FIG. 3 is a schematic perspective view of an exemplary embodiment of a wind turbine as disclosed herein;

FIG. 4 is a schematic front view of an exemplary embodiment of the main turbine shaft of the wind turbine of FIG. 3;

Figure 5:
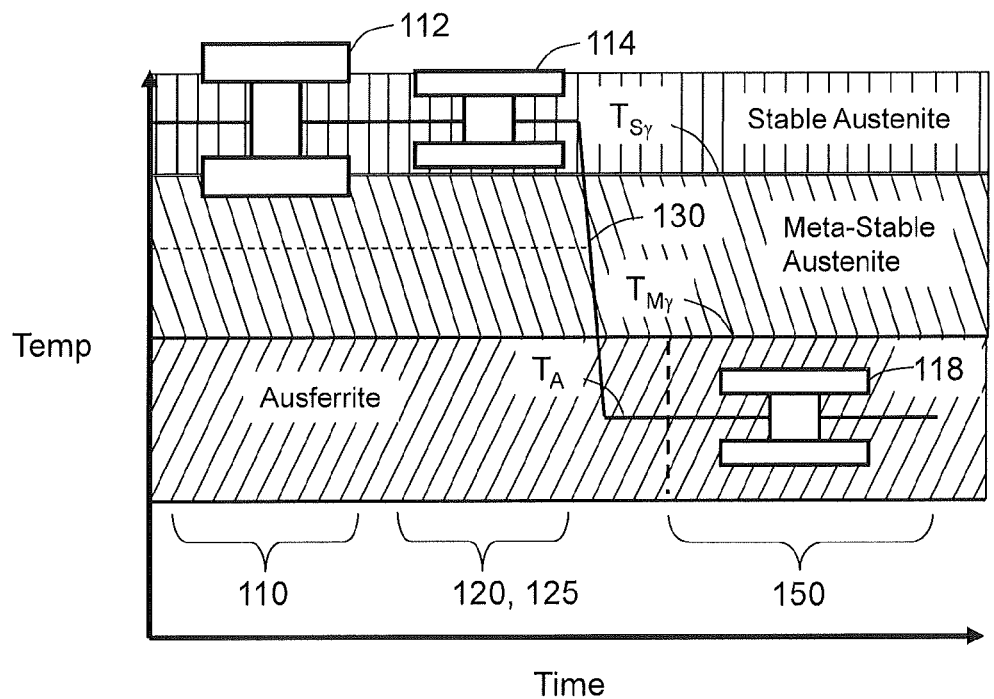
FIG. 5 is a schematic illustration of a thermal profile of an exemplary embodiment of a method of making a ductile iron article as disclosed herein.
Figure 6:
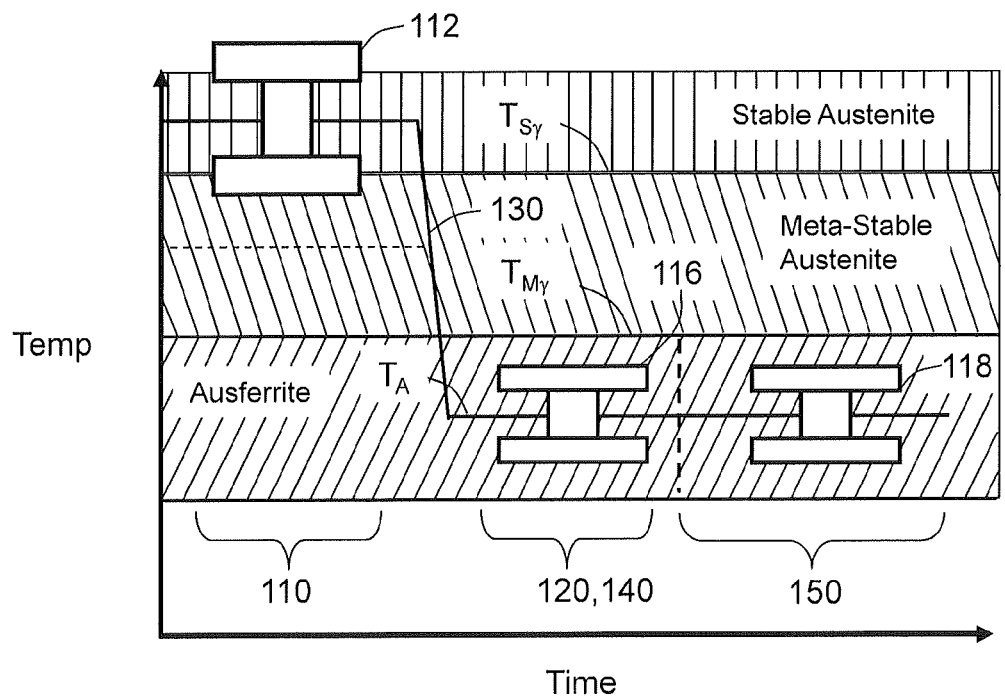
FIG. 6 is a schematic illustration of a thermal profile of a second exemplary embodiment of a method of making a ductile iron article as disclosed herein.

The detailed description explains embodiments of the invention, together with advantages and features, by way of example with reference to the drawings.

DETAILED DESCRIPTION OF THE INVENTION

Referring to FIGS. 1-8, an exemplary embodiment of a method 100 (FIG. 1) of making a ductile iron article 8 is disclosed. The method includes providing 110 a ductile iron article preform 112. The method 100 also includes deforming 120 the ductile iron article preform 112 by hot-working 125 to provide a hot-worked article 114. The method 100 further includes cooling 130 the ductile iron article preform 112 to an austempering temperature. Still further, the method 100 includes austempering 150 the ductile iron article preform 112 for a predetermined time sufficient to provide an austempered article preform 118 comprising an austempered microstructure, wherein the austempered microstructure of the hot-worked article 114 is different than in other portions of the austempered article preform 118 that are not deformed by hot-working 125. Alternately, the method 100 may also include ausforming 140 in addition to hot-working 125 the hot-worked article preform 114 after cooling 130 and prior to the predetermined time to provide an ausformed article preform 116 that also defines a deformed portion 60 of the article. Still alternately, the method 100 may also include ausforming 140 after cooling 130 from an austenitizing temperature and prior to the predetermined time to provide an ausformed article preform 116 that also defines a deformed portion 60 of the article. Hot-worked-austempered ductile iron (HWADI) and ausformed-austempered ductile iron (AADI) as described herein provide higher strength alternatives to cast austempered ductile iron (ADI) and are particularly useful for making large ductile iron articles 8, such as wind turbine shafts 18, wherein the article may weigh 7 tons or more, and have wall-section thicknesses that are more than 12 cm thick. Working a portion of the microstructure of the ductile iron article preform 112, such as by hot-working or warm-working. Hot working is performed at temperatures sufficient to provide a microstructure of stable austenite, generally above the eutectoid temperature ($T_{S\gamma}$), which is generally near 723° C. Warm-working is performed at temperatures sufficient to provide a microstructure of meta-stable austenite, generally at or below the eutectoid temperature ($T_{S\gamma}$) and above a temperature that can sustain metastable austenite, such as a temperature that is above the martensite start temperature, and includes ausforming at a temperature range over which austempering may be used to form ausferrite, generally about 300° C. to about 400° C., as illustrated schematically in FIGS. 5-8). The resulting deformed microstructure includes an ausferrite matrix, which includes acicular ferrite and high carbon stabilized austenite, having a plurality of graphite nodules dispersed therein, wherein the acicular ferrite is finer in scale in the deformed portions of the microstructure and provides higher strength and fatigue life. Additionally, deformation by hot-working or warm-working, including ausforming, can close micro-shrinkage porosity and lessen the effects of micro-segregation in last-to-freeze volumes of the ductile iron casting. Both the reduction of the scale of the acicular ferrite and reduction of the porosity effectively improve the ausferrite hardenability. The induced deformation also enables austempering of thicker sections in a given period of time than conventional austempering without the induced deformation. Deforming the ductile irons prior to austempering can provide significant mechanical property benefits to the final austempered product. Deformation can greatly increase the mechanical properties of austempered ductile iron (ADI) components as compared to components that receive austempering without deformation, including higher strength, hardness, toughness and fatigue performance. Deformed ductile iron components can provide mechanical properties comparable to those of forged steel shafts at a cost comparable to or lower than the cost of forged steel shafts.

Referring to FIGS. 1-7, the method 100 may be used to make any suitable ductile iron article 8, but is particularly well-suited to making large articles, including those having a weight of about 2 to about 20 tons or more, and more particularly those having wall-section thicknesses of about 100 to about 200 mm or more. The articles 8 are made from appropriately sized cast ductile iron article preforms 112 that are formed by hot-working or warm-working (including ausforming), or a combination thereof, and austempered to provide austempered ductile iron article preforms 118 that advantageously have a hardness, strength and toughness that are higher than identical preforms that are austempered without being formed first. The method 100 may be used to make any suitable ductile iron article 8, but is particularly useful for making various large wind turbine components, and more particularly, for making ductile iron wind turbine shafts 18. Wind turbine shafts 18 are essential components of a wind turbine 10. While wind turbine shafts 18 are essential wind turbine components, they generally have not been made from ductile cast iron owing to the fact that it has not been possible to obtain the ductility, strength, toughness and fatigue resistance required, particularly for large wind turbine shafts 18 having a weight of about 2 to about 20 tons or more, and more particularly those having wall-section thicknesses of about 100 to about 200 mm or more, as well as shafts having the other properties described herein. The use of method 100 enables the manufacture of ductile iron wind turbine shafts 18, and particularly the manufacture of large ductile iron wind turbine shafts, as well as other large ductile iron articles 8 for wind turbines 10 and other applications.

Wind turbine 10 generally includes a rotor blade assembly 12 comprising multiple blades 14 radially extending from a hub 16. The hub 16 is mounted on a rotatable ductile iron wind turbine shaft 18 (FIGS. 3 and 4), which forms part of a drive train that includes a gearbox 24 connected to an electric generator 25. The ductile iron wind turbine shaft 18, drive train and electric generator 25 are all housed within a nacelle 20 mounted on a tower 22. The rotatable ductile iron wind turbine shaft 18 includes a hub end 26 and an opposed gearbox end 28. The hub end 26 includes an integral hub flange 30 that is formed on the hub end 26 and is configured for coupling and attachment to the hub 16. The gearbox end 28 is configured for coupling and attachment to the gearbox 24. The ductile iron wind turbine shaft 18 generally includes a shaft bore 32 that extends along the longitudinal axis 34. The ductile iron wind turbine shaft 18 also may include a transition collar 36 that smooths the transition from the outer portion of the shaft body 38 to the hub flange 30. Depending on the size of the turbine 10, the main ductile iron wind turbine shaft 18 may be quite large, including those having a weight of about 2 to about 20 tons or more, wall-section thicknesses of about 100 to about 200 mm or more, lengths of about 2 m to about 4 m or more, main flange diameters of about 1 m to about 2 m or more, shaft bores of about 0.4 to about 0.8 m or more. Because the main shaft 18 must operate in cold weather and withstand a significant amount of torque of about 4000 to about 15,000 kNm and bending moment of about 7,000 to about 15,000 kNm induced by the action of wind on the blades 14, the ductile iron wind turbine shaft 18 is advantageous in that it provides a balance of strength and toughness sufficient to withstand these torques and bending moments.

As illustrated schematically in an exemplary embodiment in FIG. 4, the ductile iron wind turbine shaft 18 made by the method 100 described herein may be described as having an austempered microstructure 40 comprising an ausferrite matrix 42 and a plurality of graphite nodules 44 dispersed in the ausferrite matrix 42. The ausferrite matrix 42 includes stable austenite 46 and acicular ferrite 48. The austempered microstructure 40 has a deformed portion 60 that has a deformed microstructure 50 that is different than the microstructure of the other portion (or portions) of the shaft that has not been deformed, or has been subjected to a lesser amount of deformation. The deformed microstructure 50 may also be described as having an deformed austempered microstructure 50 comprising a deformed ausferrite matrix 52 and a plurality of deformed graphite nodules 54 dispersed in the deformed ausferrite matrix 52. The deformed ausferrite matrix 52 also includes deformed stable austenite 56 and refined acicular ferrite 58. The deformed portion 60 may include any portion of the microstructure of the ductile iron article 8, including any portion of the microstructure of the ductile iron wind turbine shaft 18. The deformed portion may, in one exemplary embodiment, include the microstructure of the shaft body 38, or a portion of the shaft body such as an outer portion as depicted in FIG. 4, or alternately through the thickness of shaft body 38. In another embodiment, the deformed portion may include a portion of a transition collar as depicted in FIG. 4, where the deformed portion 60 extends through the thickness of the hub flange from the shaft bore 32 to the outer surface. In yet another embodiment, the deformed portion 60 may include a portion of a hub flange as depicted in FIG. 4, where the deformed portion 60 extends through the thickness of the hub flange from the shaft bore 32 to the outer surface. The difference of the deformed microstructure 50 in the deformed portion 60 and the microstructure 40 that is undeformed, or less deformed, may include at least one of a platelet width (w) of the refined acicular ferrite 58 phase constituent of the ausferrite matrix, a shape of the deformed graphite nodules 54, or a porosity that is different than that of the other portion of the article 8, such as wind turbine shaft 18. The platelet width (w) of the refined acicular ferrite 58 platelets that forms in the deformed ausferrite matrix 52 in the deformed portion 60 may be substantially narrower or smaller than the acicular ferrite 48 platelets that form in the ausferrite matrix 42 of the other portion, including narrower by up to an order of magnitude. The deformation provided stored strain energy may promote a refined acicular ferrite 58 having a narrower platelet width, hence more platelets per unit of volume. The shape of the deformed graphite nodules 54 may be elongated nodules or broken fragments that are distributed and aligned in the direction of deformation in the deformed ausferrite matrix 52 in the deformed portion 60 as compared to the nodular shape, including substantially spheroidal shape, of the graphite nodules 48 that exist in the ausferrite matrix 42 of the other undeformed portion. The deformation also may close porosity, such as interdendritic porosity, including an average porosity, known to occur in cast ductile iron microstructures, in the deformed portion 60 and deformed portion 50 as compared to the microstructure 40 in the other portion. Deforming 120 may reduce the porosity, including the average pore size or the average amount of porosity, or may substantially eliminate porosity to achieve substantially full theoretical density associated with the particular ductile iron alloy composition employed. Refining the refined acicular ferrite 58 phase, and to a lesser extent changing the shape of the deformed graphite nodules 54 and lowering the porosity greatly increases hardness, impact strength, tensile strength and low cycle fatigue strength of the ductile iron article 8, including ductile iron wind turbine shaft 18.

Providing 110 a ductile iron article preform 112 may be performed in any suitable manner. A wide variety of ductile iron alloys and ductile iron article preforms 112 may be provided in accordance with method 100 as disclosed herein. The ductile iron article preforms 112 may be formed from any suitable ductile iron alloy composition. The ductile iron preform 112 may contain typical alloying constituents for ductile iron, for example, carbon, silicon and manganese and optionally copper, nickel and/or molybdenum, with the balance iron and incidental impurities such as chromium, phosphorus, sulfur, etc. Particular ranges for some of these constituents include, by weight, about 3.0% to about 3.9% carbon, about 1.9% to about 2.7% silicon, up to 0.3% manganese, up to 0.8% copper, up to 2% nickel, up to 0.05% chromium, up to 0.02% vanadium, up to 0.01% sulfur, and up to 0.3% molybdenum, with the balance iron and incidental impurities. As known in the art, the level for carbon is necessary for graphite formation and castability considerations. The role of silicon is generally to promote the formation of graphite instead of metastable iron carbide during solidification. The carbon content separates as spheroidal graphite during solidification, primarily as the result of the presence of silicon. The spheroidal graphite imparts such desirable properties as high strength and toughness for which ductile iron alloys are known. Molybdenum can be included to increase ausferrite hardenability and retard pearlite formation in austempered ductile irons. Manganese can be included to scavenge sulfur, which is preferably absent from the alloy but is usually unavoidably present as an impurity. For castings having a relatively thick section, such as the main shaft 18, phosphorus is considered detrimental because it counteracts the effects of molybdenum. Therefore, phosphorous levels are preferably kept at levels as low as possible, for example, below 0.1 weight percent. Also in heavy section castings such as the shaft 18, relatively high levels of copper, nickel and molybdenum may be necessary for ausferrite hardenability considerations, for example, toward the upper ends of their above-stated ranges. Generally, preferred alloy additions and their relative amounts can be balanced to achieve sufficient hardenability for a given section size, while minimizing alloy segregation levels and cost.

In order to obtain a refined grain microstructure, high graphite nodule count, and minimal microsegregation of the alloying constituents to grain boundaries and resultant porosity, a melt of the ductile iron alloy can be cast using a rapid solidification process, which as used herein refers to a process capable of solidifying a melt of a ductile iron alloy at a rate sufficient to obtain a high graphite nodule count. As an example, suitable rapid solidification processes achieve a graphite nodule count of greater than 100 per square millimeter, more preferably, about 150 to about 300 per square millimeter. Such cooling rates are also capable of achieving a refined grain size throughout the casting and minimizing the microsegregation of alloying constituents to the intercellular regions or grain boundaries of the casting. An acceptable level of microsegregation is indicated by achieving a nodule count above 100 per square millimeter and a matrix that is essentially free of martensite, pearlite, and intercellular carbides in other words, martensite, pearlite and intercellular carbide contents of less than 5 volume percent in the matrix. On the other hand, excessive microsegregation at eutectic cell boundaries can be indicated by a low nodule count and high pearlite fractions if the cooling rate to the austempering temperature is insufficient, or by a low nodule count and an excessive martensite content (above 5 volume percent) and a low ausferrite content (below 85 volume percent) in the matrix due to insufficient stabilization of the carbon-enriched austenite during the isothermal austempering.

Providing 110 the ductile iron article preform 112 may be accomplished using any suitable method for casting ductile iron. In one exemplary embodiment, the article may be sand cast or cast in a permanent mold to provide ductile iron article preform 112. In another embodiment, the providing 110 of ductile iron article preform 112 may be accomplished by centrifugal casting. Centrifugal casting is a notable example of a rapid solidification casting technique for providing 110 the ductile iron article preform 112. As known in the art, centrifugal casting of ductile iron article preforms 112, such as may be used to produce a ductile iron wind turbine shaft 18, generally entails dispensing a melt of an alloy inside a cylindrical-shaped mold that is rotating about its longitudinal axis, such as a casting mold for a ductile alloy wind turbine shaft 18 (FIG. 4) where the mold axis includes the axis 34 of the shaft. The mold may be rotated at a sufficient speed to ensure that the molten alloy is forced radially outwardly against the interior surface of the mold, where the alloy rapidly solidifies to achieve a fine-grained casting as a result of the alloy being rapidly chilled by the mold. Advantageously, the rapid solidification process also promotes a high graphite nodule count due to increased nucleation and slow growth of graphite, as well as limits the opportunity for segregation of alloying constituents to grain boundaries. Suitable rotational speeds for the mold will vary depending on, for example, the inner diameter of the mold and the wall-section thicknesses desired for the casting.

Because of the rotation of the mold, providing 110 the ductile iron article preform 112 castings by centrifugal casting techniques may result in axisymmetric, non-homogeneous microstructures, where the microstructures vary radially and/or axially. In the past, centrifugal cast ductile iron components were typically limited to applications that were tolerant of the axisymmetric, non-homogeneous microstructures geometry, or which had a geometry where axisymmetric microstructures could be avoided, such as piping for municipal water supplies, sewage lines, etc., which would not typically require mechanical or microstructural properties that would utilize an austempering heat treatment. However, the method 100 may utilize the fine microstructures that can be developed during rapid solidification of centrifugal cast components and overcome limitations associated with axisymmetry or non-homogeneity of the as-cast article preforms 112 by deforming 120 and austempering 150 to obtain the desired properties in large ductile iron articles 8, such as ductile iron wind turbine shafts 18. It should be noted that other casting techniques capable of achieving rapid solidification rates may also be used, including permanent mold and sand casting techniques that have been modified to achieve the high solidification rates necessary to obtain a refined microstructure, reduced degree of microsegregation, and high graphite nodule count, which in turn provide the desired response during deforming 120 and austempering 150, namely, a matrix that is mostly ausferrite and essentially free of martensite and pearlite, and more preferably a complete ausferrite transformation and the absence of brittle phases such as martensite.

Deforming 120 may include any amount of deformation of the deformed portion 60. In an exemplary embodiment, the strain, including true strain, may include plastic strain of about 5 percent to about 50 percent, and more particularly about 10 percent to about 20 percent. The deformation may be apportioned within the ductile iron article 8 in any suitable manner, and in certain embodiments may be uniform or homogeneously distributed within the ductile iron article 8, and in certain other embodiments may be heterogeneously distributed within article 8. In an exemplary embodiment of a ductile iron wind turbine shaft 18, the shaft body 38 may include a deformed portion 60 having a plastic deformation of about 5 percent or less, and the deformed portion may extend from an outer surface inwardly in any amount, including inwardly through the thickness to the shaft bore 32. In another exemplary embodiment, of a ductile iron wind turbine shaft 18, the transition collar 36 may include a deformed portion 60 having a plastic deformation of about 5 percent to about 20 percent, and more particularly about 10 percent to about 20 percent, and the deformed portion may extend from an outer surface inwardly in any amount, including inwardly through the thickness to the shaft bore 32. In another exemplary embodiment, of a ductile iron wind turbine shaft 18, the hub flange 30 may include a deformed portion 60 having a plastic deformation of about 5 percent to about 20 percent, and more particularly about 10 percent to about 20 percent, and the deformed portion may extend from an outer surface inwardly in any amount, including inwardly through the thickness to the shaft bore 32. In all of these embodiments, the amount of deformation may vary within the deformed portion, including varying radially inwardly or outwardly through the thickness, or axially along the length of the ductile iron article 8, such as ductile iron wind turbine shaft 18.

Deforming 120 includes heating the ductile iron article preform 112 to a hot-working temperature that is above the austenitization temperature ($T_{S_\gamma}$) for a duration sufficient to yield a microstructure having a single-phase matrix of austenite that contains carbon prior to deforming the preform. In an exemplary embodiment, the hot-working temperature may include heating the ductile iron article preform 112 to about 815° C. to about 980° C., and holding the preform casting at the hot-working temperature for a duration of about one to about three hours. In one embodiment, deforming 120 may include deforming 120 the ductile iron article preform 112 by hot-working 125 to provide a hot-worked article 114 having a deformed portion 60 as shown in FIG. 5. Deforming 120 may be performed by any suitable method for deforming, and in one embodiment may include forging. Hot-working 125 by forging at the austenitizing temperature reduces the forging pressures required to deform the ductile iron article preform 112 and form hot-worked article preform 114 as compared to forging at temperature below the austenitizing temperature. This is a significant advantage as it lowers the capacity or size of the forging presses required, which substantially lowers the cost to produce the part, since the forging presses required to forge at lower temperatures are very large and are not readily commercially available, and exist only in a few locations worldwide.

Figure 7:
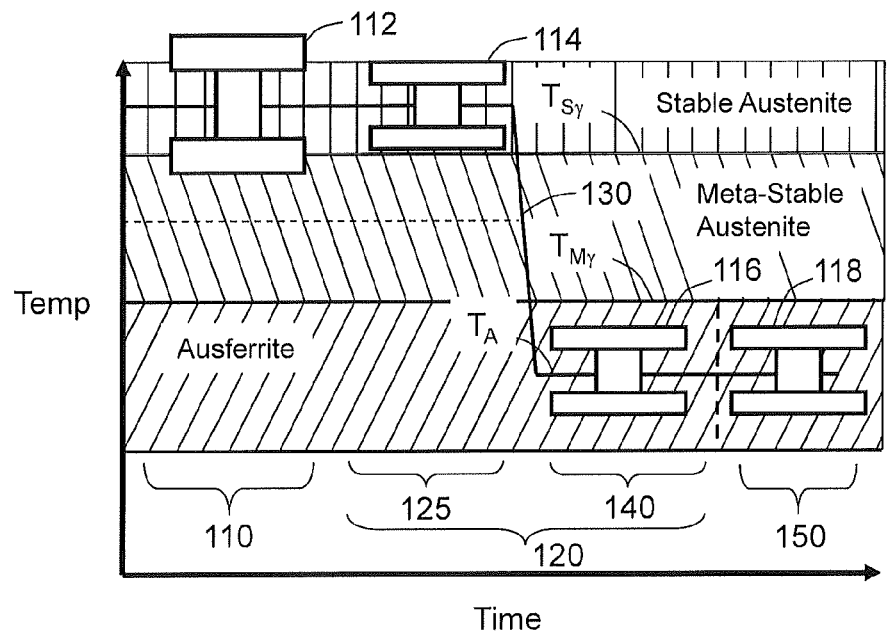
FIG. 7 is a schematic illustration of a thermal profile of a third exemplary embodiment of a method of making a ductile iron article as disclosed herein.
Figure 8:
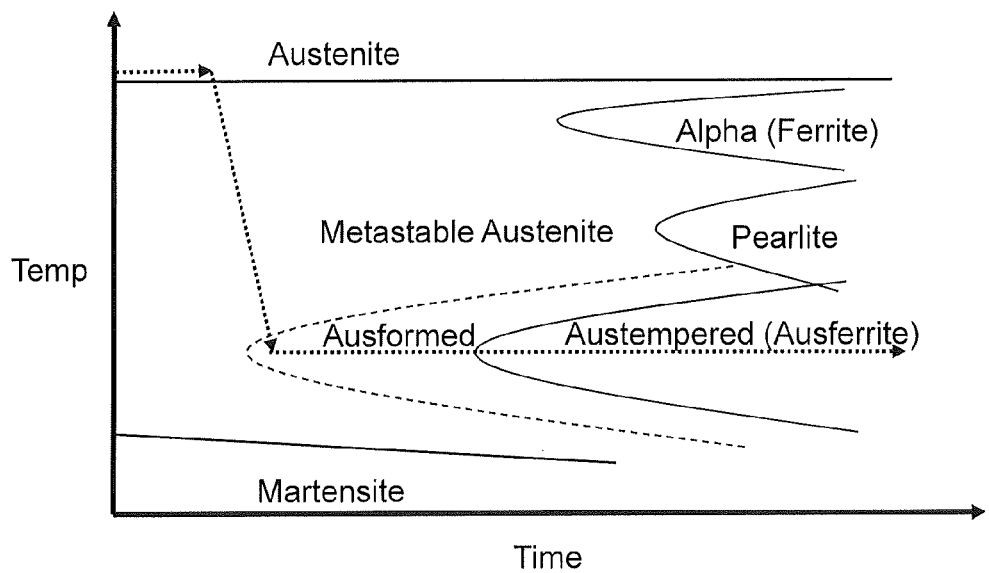
FIG. 8 is a schematic illustration of a time-temperature-transformation (TTT) diagram of a ductile iron alloy composition having a thermal profile of a method as disclosed herein superimposed thereon.

Alternately, according to the method 100, deforming 120 may also include hot-working 125 and then ausforming 140 the ductile iron article preform 112 at the ausforming temperature ($T_A$) after cooling 130 and prior to the predetermined time necessary to austemper the microstructure and transform the microstructure to ausferrite as described herein and illustrated in FIG. 7. Ausforming 140 provides ausformed article preform 116 as described herein. The ausformed article preform 116 may then be held at the austempering temperature ($T_A$) for a time sufficient to transform the ausformed article preform 116 and form austempered article preform 118.

As a further alternative, according to the method 100, deforming 120 may also include heating a ductile iron article preform 112 to an austenitizing temperature to austenitize the alloy microstructure followed by cooling 130 the preform to an ausforming temperature ($T_A$) followed by ausforming 140 the ductile iron article preform 112 at the ausforming temperature ($T_A$) prior to the predetermined time necessary to austemper the microstructure and transform the microstructure to ausferrite as described herein and illustrated in FIG. 7. The ausformed article preform 116 may then be held at the austempering temperature ($T_A$) for a time sufficient to transform the ausformed article preform 116 and form austempered article preform 118.

In the various embodiments, method 100 generally includes cooling 130 the ductile iron article preform 112 to an austempering temperature ($T_A$). Cooling 130 may be performed in any suitable manner, including air cooling or quenching in a suitable quenching medium, to an austempering temperature ($T_A$). As known in the art, the austempering temperature is above the martensite start temperature of the ductile iron alloy to avoid formation of martensite in the casting. Austempering 150 may be performed in a temperature range of about 230° C. to about 400° C., and the austempering temperature may be held for a duration of about one to about four hours, though greater and lesser temperatures and durations are also possible. At the austempering temperature, the casting undergoes an ausferrite transformation in which the parent austenite (FCC γ-iron) is transformed to acicular ferrite (BCC α-iron) and in a high carbon stabilized austenite.

In general, a high austempering temperature will promote fatigue strength and ductility, while a low austempering temperature will promote strength and wear resistance. Accordingly, the austempering temperature can be chosen to promote certain properties of the ductile iron wind turbine shaft 18, depending on its particular requirements.

The importance of the quench method and quench rate should also be noted. The equipment used to cool the casting from the austenitization temperature to the austempering temperature can be optimized to promote the kinetics of the austempering process and promote a complete transformation across the entire section thickness, thereby limiting the propensity to form brittle phases. In particular, the equipment preferably promotes a more efficient heat transfer from the casting to the quench medium, which is typically a salt bath. Therefore, modifications and alternatives to a conventional salt bath may be employed to promote the ausferrite transformation. Also, deforming 120 accelerates the ausferrite transformation and shifts the TTT curve as illustrated schematically in FIG. 8. The faster reaction kinetics enable transforming a given wall-section thickness more rapidly, or enables transforming a given wall-section to a deeper depth, as compared to a similar ductile iron article preform that has not be deformed as described herein. Such modifications and alternatives may also be able to compensate for shortcomings of the casting process that resulted in one or more of the preferred characteristics (refined grain microstructure, high graphite nodule count, and minimal microsegregation) being incompletely met. In any event, the casting is quenched fast enough to avoid pearlite formation, for example, at a rate of at least 5.5° C./minute. Minimum quench rates will depend in part on how much nickel, molybdenum, copper, etc., are present in the alloy.

Following the austempering soak, the castings can be allowed to cool to room temperature to provide ductile iron articles 8, such as ductile iron wind turbine shaft 18, as described herein. The resulting deformed and austempered casting is characterized by being through-hardened and having a microstructure made up of a matrix that is substantially, if not entirely, ausferrite and substantially, if not entirely, free of martensite and pearlite. As a result, desired mechanical properties for the casting, including hardness, impact strength, tensile strength, fatigue strength and toughness, can be more readily achieved in the deformed portions 60, which may be selected to include portions of the ductile iron wind turbine shaft 18 that have high operating stresses, such as the shaft body 38, transition collar 36 or hub flange 30, where higher structural requirements are typically necessary.

Ductile iron articles 8, including wind turbine shaft 18, produced according to method 100 are capable of exhibiting strength-toughness combinations that can rival low alloy steels, while offering such potential advantages as better wear resistance and better vibration and noise damping, along with the potential for weight reduction and cost savings. The machinability of the deformed and austempered through-hardened ductile iron articles 8, including wind turbine shafts 18, are likely comparable to a heat treated steel. However, the ductile iron articles 8 are also likely to exhibit a smaller and more predictable growth compared to a shaft of similar size and design produced by a quench and tempering operation. As a result, dimensional changes that occur during deforming and austempering can be accurately predicted to limit the amount of final machining operations necessary. As such, the majority of machining can be performed immediately after casting while the casting is still relatively soft.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of constituents of an alloy composition is applied to all of the listed constituents, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of making a ductile iron article, comprising:
    providing a ductile iron article preform;
    deforming the ductile iron article preform by hot-working to provide a hot-worked portion of the ductile iron article preform, the hot-working performed at a temperature above a eutectoid temperature of the ductile iron to provide a microstructure of stable austenite;
    cooling the ductile iron article preform to an austempering temperature;
    austempering the ductile iron article preform for a predetermined time sufficient to provide an austempered ductile iron article preform comprising an austempered microstructure; and
    ausforming the ductile iron article preform after cooling and prior to the predetermined time to provide an ausformed portion of the ductile iron article preform, wherein the austempered microstructure of the hot-worked portion and the ausformed portion are different than in other portions of the austempered ductile iron article preform, and wherein the different austempered microstructure of the hot-worked portion and the ausformed portion comprises at least one of a refined acicular ferrite phase having a reduced platelet width, a shape of deformed graphite nodules, or a reduced porosity, as compared to the other portions of the austempered ductile iron article preform.

2. The method of claim 1, wherein the hot-worked portion and the ausformed portion comprise the same portions of the ductile iron article preform.

3. The method of claim 1, wherein the hot-worked portion and the ausformed portion comprise different portions of the ductile iron article preform.

4. The method of claim 1, wherein the ductile iron article preform comprises a wind turbine shaft having a hub end and a gearbox end, and wherein the hot-worked portion is proximate the hub end.

5. The method of claim 4, wherein the hot-worked portion comprises a hub flange or a transition collar.

6. The method of claim 1, wherein the ductile iron article preform comprises a wind turbine shaft having a hub end and a gearbox end, and wherein the hot-worked portion or the ausformed portion are proximate the hub end.

7. The method of claim 1, wherein the ductile iron article preform comprises a wind turbine shaft, and wherein the hot-worked portion or ausformed portion comprise a hub flange, transition collar or shaft body.

8. The method of claim 7, wherein at least one of the hub flange or transition collar are deformed by about 5 to about 50 percent.

9. The method of claim 7, wherein the shaft body is deformed by about 5 percent or less.

10. The method of claim 1, wherein the ductile iron article preform has a mass of 2 tons or more.

11. The method of claim 10, wherein the ductile iron article preform has a section thickness of 100 mm or more.

12. A method of making a ductile iron wind turbine shaft, comprising:
provided a ductile iron wind turbine shaft preform;
deforming the ductile iron wind turbine shaft preform by hot-working to provide a hot-worked portion of the wind turbine shaft preform or ausforming to provide an ausformed portion of the wind turbine shaft preform, or a combination thereof, the hot-working performed at a temperature above a eutectoid temperature of the ductile iron to provide a microstructure of stable austenite;
austempering the ductile iron wind turbine shaft preform for a predetermined time sufficient to provide an austempered ductile iron wind turbine shaft preform comprising an austempered microstructure; and
ausforming the ductile iron wind turbine shaft preform after cooling and prior to the predetermined time to provide an ausformed portion of the ductile iron wind turbine shaft preform, wherein the austempered microstructure of the hot-worked portion and the ausformed portion is different than in other portions of the austempered ductile iron wind turbine shaft preform, and wherein the different austempered microstructure of the hot-worked portion and the ausformed portion comprises at least one of a refined acicular ferrite phase having a reduced platelet width, a shape of deformed graphite nodules, or a reduced porosity, as compared to the other portions of the austempered ductile iron article preform.

13. The method of claim 12, wherein the hot-worked portion or ausformed portion comprise a hub flange, transition collar or shaft body.

* * * * *